(12) United States Patent
Matlack et al.

(10) Patent No.: US 9,120,414 B1
(45) Date of Patent: Sep. 1, 2015

(54) VEHICLE FOR BALE LOADING, CARRYING, AND OFF-LOADING

(71) Applicants: Larry W. Matlack, Burrton, KS (US); William L. Matlack, Burrton, KS (US)

(72) Inventors: Larry W. Matlack, Burrton, KS (US); William L. Matlack, Burrton, KS (US)

(73) Assignee: Stinger, Inc., Haven, KS (US)

( * ) Notice: Subject to any disclaimer, the term of this patent is extended or adjusted under 35 U.S.C. 154(b) by 122 days.

(21) Appl. No.: 13/952,586

(22) Filed: Jul. 27, 2013

(51) Int. Cl.
*B60P 7/06* (2006.01)
*B60P 7/08* (2006.01)
*B60P 7/14* (2006.01)

(52) U.S. Cl.
CPC ............... *B60P 7/06* (2013.01); *B60P 7/0823* (2013.01); *B60P 7/14* (2013.01)

(58) Field of Classification Search
CPC ........ B60P 7/08; B60P 7/0823; B60P 7/0838; B60P 7/0869
USPC ............. 410/32, 34, 96, 97, 100, 120, 129; 414/24.5, 111; 56/473.5
See application file for complete search history.

(56) References Cited

U.S. PATENT DOCUMENTS

| | | | | |
|---|---|---|---|---|
| 5,024,567 | A * | 6/1991 | Dominguez et al. | 410/100 |
| 5,397,208 | A * | 3/1995 | Siebenga | 414/111 |
| 5,507,612 | A * | 4/1996 | Siebenga | 414/111 |
| 5,876,164 | A * | 3/1999 | Hamelin et al. | 410/35 |
| 5,899,646 | A * | 5/1999 | Tatina et al. | 410/100 |
| 6,158,932 | A * | 12/2000 | Little | 410/103 |
| 6,283,700 | B1 * | 9/2001 | Oltrogge | 414/607 |
| 6,312,205 | B1 * | 11/2001 | Vandenberg | 414/24.5 |
| 6,655,266 | B2 * | 12/2003 | Brown, Jr. | 100/18 |
| 7,044,700 | B2 * | 5/2006 | Tessier et al. | 410/100 |
| 7,399,153 | B2 * | 7/2008 | Koehn et al. | 414/24.5 |
| 7,465,140 | B2 * | 12/2008 | Pronovost et al. | 414/111 |
| 7,866,925 | B1 | 1/2011 | Matlack et al. | |
| 2006/0251501 | A1 * | 11/2006 | Koehn et al. | 414/501 |

* cited by examiner

*Primary Examiner* — Hilary Gutman
(74) *Attorney, Agent, or Firm* — Kenneth H. Jack; Davis & Jack, L.L.C.

(57) ABSTRACT

A bale carrier including a "C" clamp whose front and rear jaws have lower segments and upper segments, the "C" clamp having a load bed frame; first hydraulic cylinders connected to one of the jaws for extending and retracting the front and rear jaws, second hydraulic cylinders connected to the jaws' upper segments for extending and retracting the upper segments; bale straps extending between the jaws' upper segments, pivot joints interconnecting the jaws' lower and upper segments for pivoting the bale straps for bale securing and bale clearing; and a plurality of wheels fixedly attached to and extending downwardly from the load bed frame.

14 Claims, 8 Drawing Sheets

VEHICLE FOR BALE LOADING, CARRYING, AND OFF-LOADING

FIELD OF THE INVENTION

This invention relates to flatbed trucks and trailers which are adapted for over the road carriage of cargo such as large square hay bales. More particularly, this invention relates to such vehicles which include a load carrying bed which is adapted for securing bales for road carriage and releasing bales for off-loading.

BACKGROUND OF THE INVENTION

"C" clamp configured trucks or trailers which include a flat bale carrying and supporting load bed and which include longitudinally rear bulkheads for compressing and releasing loaded bales in the manner of the jaws of a "C" clamp are known. Such "C" clamp configured load beds are also known to adapt their front and rear bulkheads or jaws for telescopingly extending their upper ends upwardly and downwardly for drawing and downwardly tightening bale securing straps over the tops of loaded bales. Rear to front pressure exerted by the bulkheads in combination with top to bottom pressure exerted by the straps of such bale securing rigs securely holds loaded bales for road transport.

A drawback or deficiency of such known "C" clamp configured bale carrying trucks and trailers is often experienced during bale loading or unloading upon interference of overhead bale securing straps with uppermost bales. Such overhead bale straps undesirably snag against and interfere with loading and unloading the uppermost stacked bales.

The instant inventive vehicle for loading, carrying, and off-loading bales solves or ameliorates such drawbacks and deficiencies by specially configuring the assembly's front and rear bulkhead jaws for substantially automatically moving the bale securing straps laterally and downwardly during bale loading and bale off-loading operations.

BRIEF SUMMARY OF THE INVENTION

The instant inventive vehicle typically comprises a trailer component of a semi-tractor trailer rig. Suitably, the vehicle may alternatively comprise a truck having a fixed rear load bed. In either configuration, the inventive vehicle serves functions of bale loading, bale carriage, and bale off-loading by specially configuring the vehicle's preferably flat load bed as and for function in the manner of a "C" clamp. As referred to herein, bales carried by the instant inventive vehicle typically comprise square hay bales. However, the terms "bale" and "bales" used herein are intended to broadly describe and include various other types of square or box configured cargo which may be carried upon a flat truck load bed or trailer load bed.

A first structural component which enables the instant invention's specialized "C" clamp function constitutes a frame member which preferably comprises an upper flat load bed in combination with an underlying truck or trailer chassis. Similarly with an upwardly opening "C" clamp which presents front and rear or longitudinal and oppositely longitudinal jaws, the "C" clamp character of the instant invention incorporates front and rear bulkhead jaws which are respectively attached to front and rear ends of the frame. Each jaw among the "C" clamp's front and rear bulkhead jaws preferably has a lower bulkhead segment, and has at least a first, and preferably first and second or left and right, pivotable upper bulkhead segments, each upper segment having proximal and distal ends.

Further structural components of the instant inventive vehicle comprise first extending and retracting means which are preferably connected operatively to at least one of the jaws among the vehicle's front and rear bulkhead jaws. In the preferred embodiment, the first extending and retracing means are mechanically adapted for alternatively positioning the front and rear jaws with respect to each other for, upon substantially full loading of square bales upon the load bed, longitudinally compressing the bales, and upon reversal of operation of such means, releasing such bales for off-loading. In a preferred embodiment, the first extending and retracting means incorporate a longitudinally slidable mount of the vehicle's rear bulkhead jaw in combination with powerful linear motion actuators which may forcibly slide the rear bulkhead jaw forwardly against loaded bales. While the preferred linear motion actuator utilized as the first extending and retracting means (and utilized as other extending and retracting means discussed below) comprises two way hydraulic cylinders, other commonly known linear motion actuators such as jack screw assemblies, electric motor driven ball screw assemblies, pneumatic cylinders, rack and pinion actuators, pulley actuators, and the like may be suitably substituted and fall within the scope of the invention.

A further structural component of the instant inventive vehicle comprises second extending and retracting means which are incorporated within or connected operatively to the front and rear jaws' upper segments. In a preferred embodiment, the second extending and retracting means are adapted for alternatively moving the at least first upper segments' distal ends away from and toward their proximal ends. Preferably, such second extending and retracting means configure the jaws' upper segments as telescoping shafts and incorporate hydraulic cylinders which span the relatively sliding segments of the telescoping shafts for extending and retracting motion.

A further structural component of the instant inventive vehicle comprises at least a first bale strap, and preferably first and second or left and right bale straps, which are fixedly attached to and extend longitudinally between distal ends of the jaws' upper segments.

A further structural component of the instant inventive vehicle comprises third extending and retracting means which preferably operatively interconnect the front and rear jaws' lower segments and upper segments, the third extending and retracting means preferably being adapted for laterally pivoting and counter-pivoting the jaws' upper segments. Upon such pivoting, the bale straps advantageously move between overhead bale securing positions and laterally and downwardly displaced bale clearing positions. Upon actuation of the third extending and retracting means to move the bale straps to their overhead bale securing positions, upward actuation of the second extending and retracting means may move the bale straps upwardly to clear the upper ends of uppermost loaded bales. Opposite downward actuation of the second extending and retracting means effectively pulls the bale straps downwardly against such uppermost bales, compressing and securing the bales against the load bed. Provided that the second extending and retracting means have upwardly moved the bale straps to an overhead bale clearing position, an opposite actuation of the third extending and retracting means advantageously carries the bale straps leftwardly and rightwardly along pivoting arcs laterally and downwardly to lower bale clearing positions. At the lower or left and right bale clearing positions, the bale straps are preferably positioned close to or adjacent to the load bed's lateral edge. While the bale straps occupy their lower bale clearing positions, square bales may be stacked upon the load bed through the use of mechanized loading equipment without risk of snagging or impingements of the bale straps against the bales.

Where the instant inventive vehicle which includes two longitudinally extending bale straps which are operatively supported by pivoting first and second or left and right upper jaw segments, as is preferred, the left and right straps, in combination with their left and right upper jaw segments, may advantageously move analogously with a butterfly's wing motion between positions at the lateral and oppositely lateral or left and right sides of the load bed, and upwardly extended positions.

Accordingly, objects of the instant invention include the provision of a vehicle for bale loading, carrying, and off-loading which incorporates structures as described above, and which arrange those structures in manners described above for performance of the functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
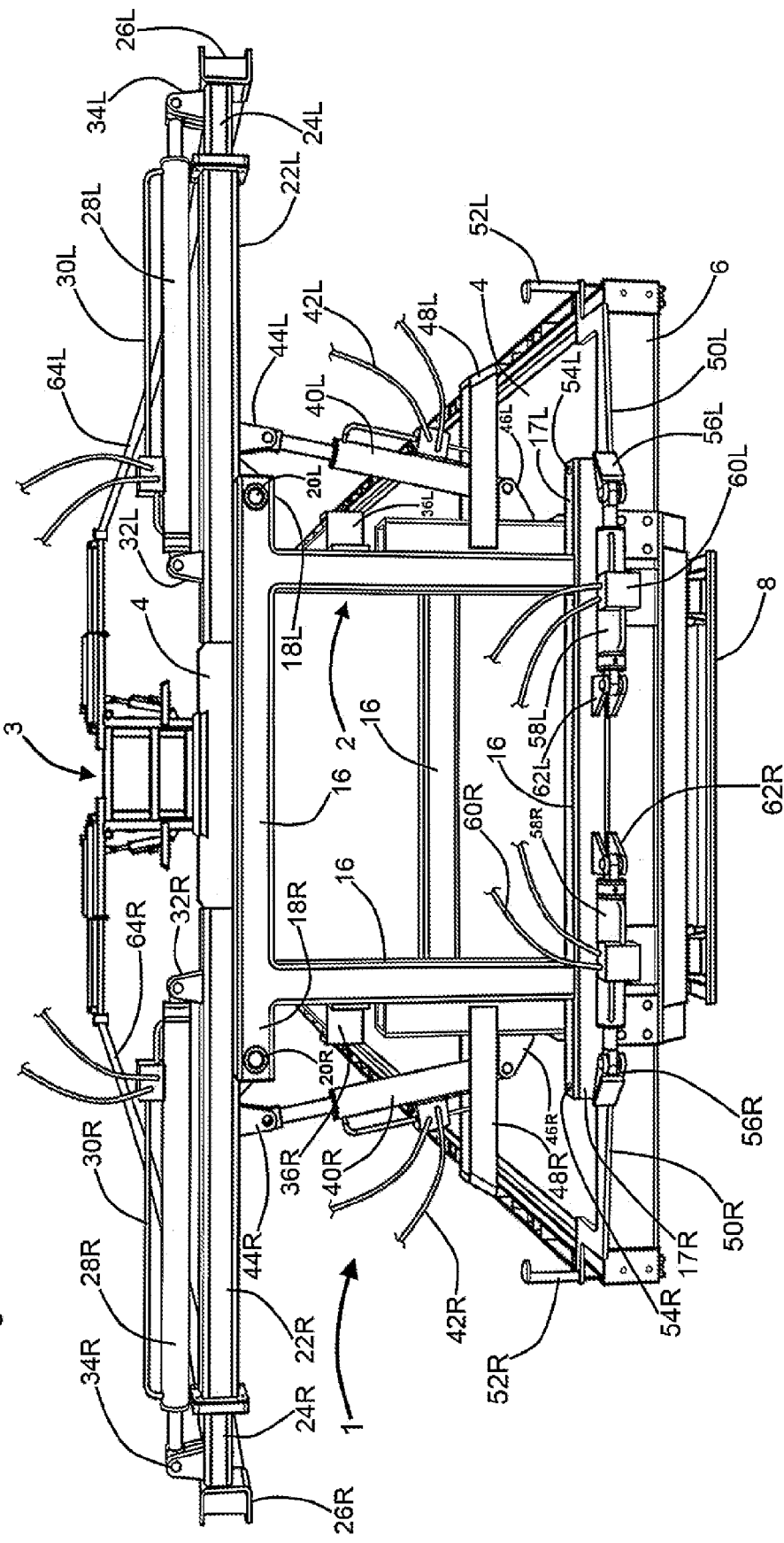
FIG. 1 is a front view of a preferred embodiment of the instant inventive bale loading and carrying vehicle.

Referring now to the drawings, and in particular simultaneously to FIGS. 1-4, the instant inventive vehicle is referred to generally by Reference Arrow 1. The vehicle 1 preferably comprises a longitudinal trailer or truck bed chassis 75 which supports a flat load bed 4. The load bed 4 has a longitudinal front end 6, front end jack and hitch structures 8, an oppositely longitudinal rear end 10, a bumper 12, and wheels 14 mounted to the chassis 75 for rolling road carriage.

The chassis 75 and load bed 4 advantageously function as a frame or spine component of a bale compressing "C" clamp, such clamp having front and rear bulkhead jaws which are referred to generally by Reference Arrows 2 and 3. Each of the "C" clamp's bulkhead jaws 2 and 3 is preferably segmented to include a lower segment and at least a first, and preferably first and second or left and right upper segments. The lower segment of the front bulkhead jaw 2 preferably comprises a rigid weldment 16 which is fixedly attached to and extends substantially vertically upwardly from the front end of the frame. The front bulkhead jaw lower segment 16 preferably presents pivot mount supporting arms 17L, 17R, 18L, and 18R, the functions of which are discussed below. Lower segment structures of the rear bulkhead jaw 3 which are numbered similarly (with the addition of the prefix "1") with corresponding forward structures are configured similarly with such forward structures.

Figure 6:
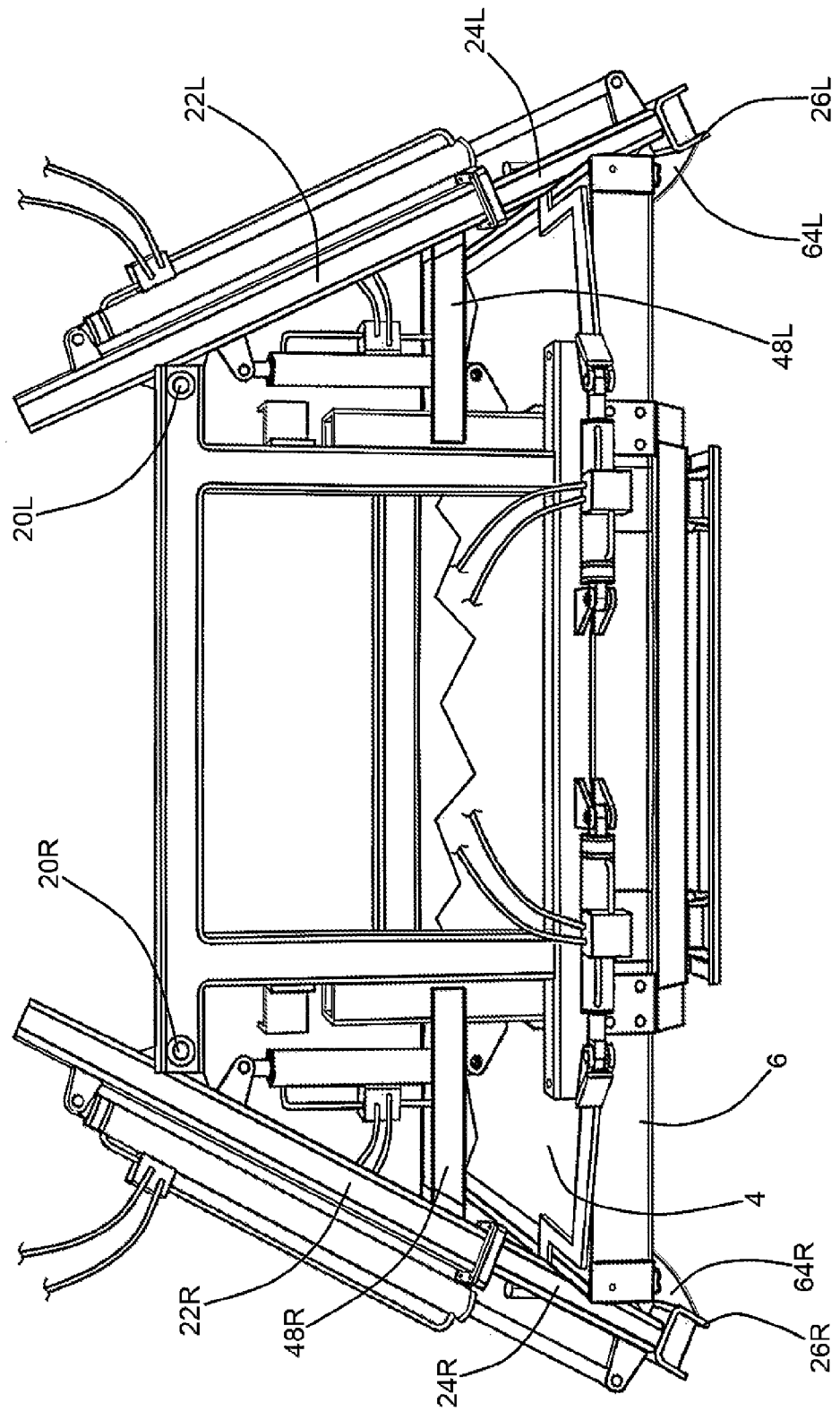
FIG. 6 redepicts the structure of FIG. 4, the view of FIG. 6 showing arm segments and bale straps positioned for bale loading and off-loading.

Each of the front and rear bulkhead jaws 2 and 3 preferably comprises at least a first and preferably first and second or left and right upper segments, such upper segments preferably comprising telescoping shafts 22L and 24L, 22R and 24R, 122L and 124L, and 122R and 124R, and such jaw upper segments being pivotally mounted to lower segments 16 and 116 at rotary bearings 20L,20R, and 120L,120R which are supported at distal ends of pivot mount arms 18L,18R, and 118L,118R. Upon full upward extensions of the upper segments 22L and 24L, 22R and 24R, 122L and 124L, and 122R and 124R, to the upwardly pivoted positions depicted in FIGS. 2-4, proximal ends of such segments are stopped from hyper-extending beyond their vertical orientations by pivot stops 36L, 36R, 136L, and 136R, such stops being fixedly attached to left and right upright members of the lower segments 16 and 116. Referring further simultaneously to FIG. 6, upon complete pivoting flexion of the bulkhead jaws' upper segments 22L,24L,22R,24R,122L,124L,122R,124R, to the positions indicated in FIG. 6, flexion stops 48L, 48R, 148L, and 148R which are similarly attached to upright members of lower segments 16 and 116 correspondingly stop any excess flexion of the upper arm segments. Strap mounts 26L, 26R, 126L, and 126R are fixedly attached to upper or distal ends of the upper segments of the front and rear bulkhead jaws 2 and 3, such strap mounts supporting at least a first, and preferably a left and right pair of bale securing straps 64L and 64R.

Figure 2:
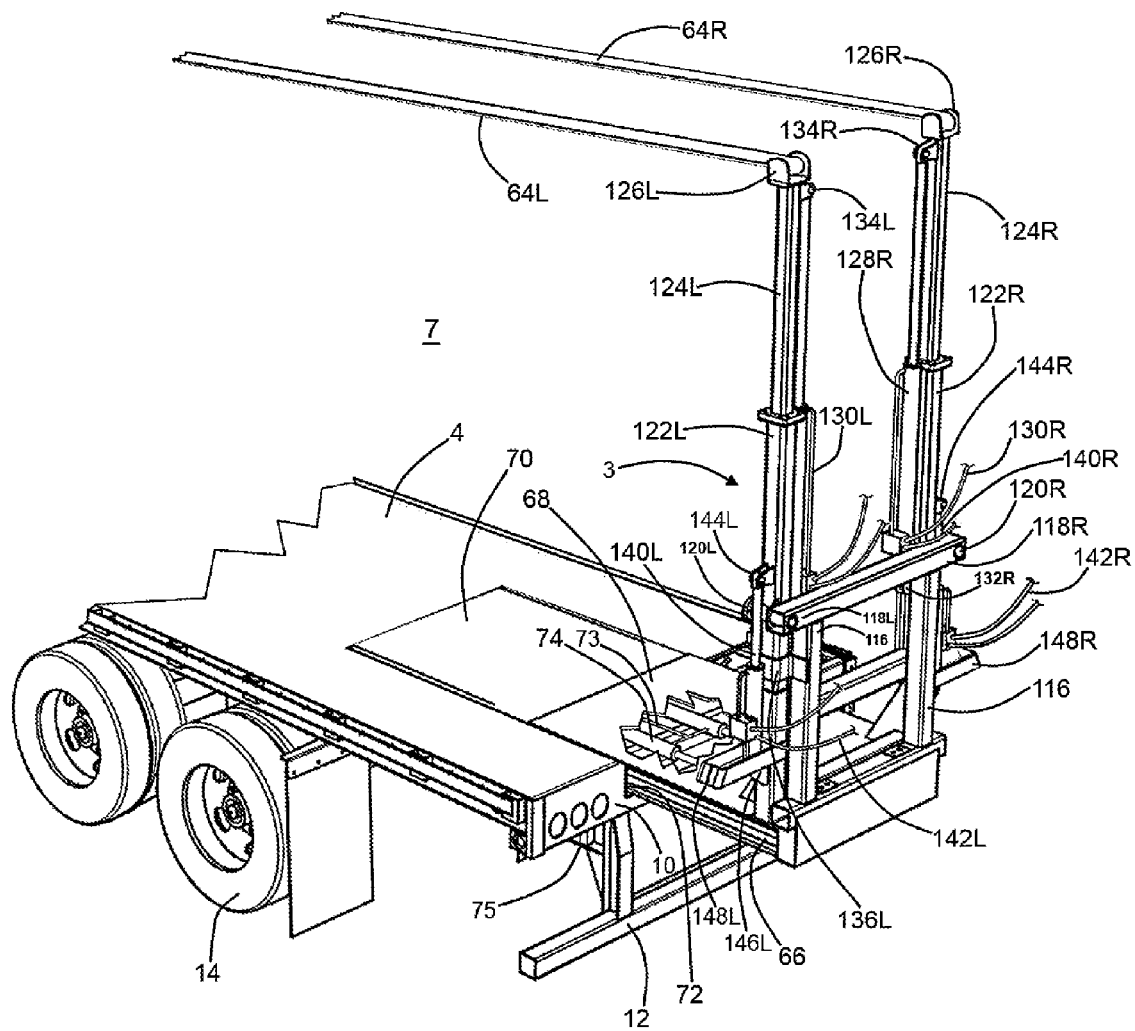
FIG. 2 is a partial rear and perspective view of the instant inventive vehicle, the view showing a rear bulkhead jaw component rearwardly extended.
Figure 3:
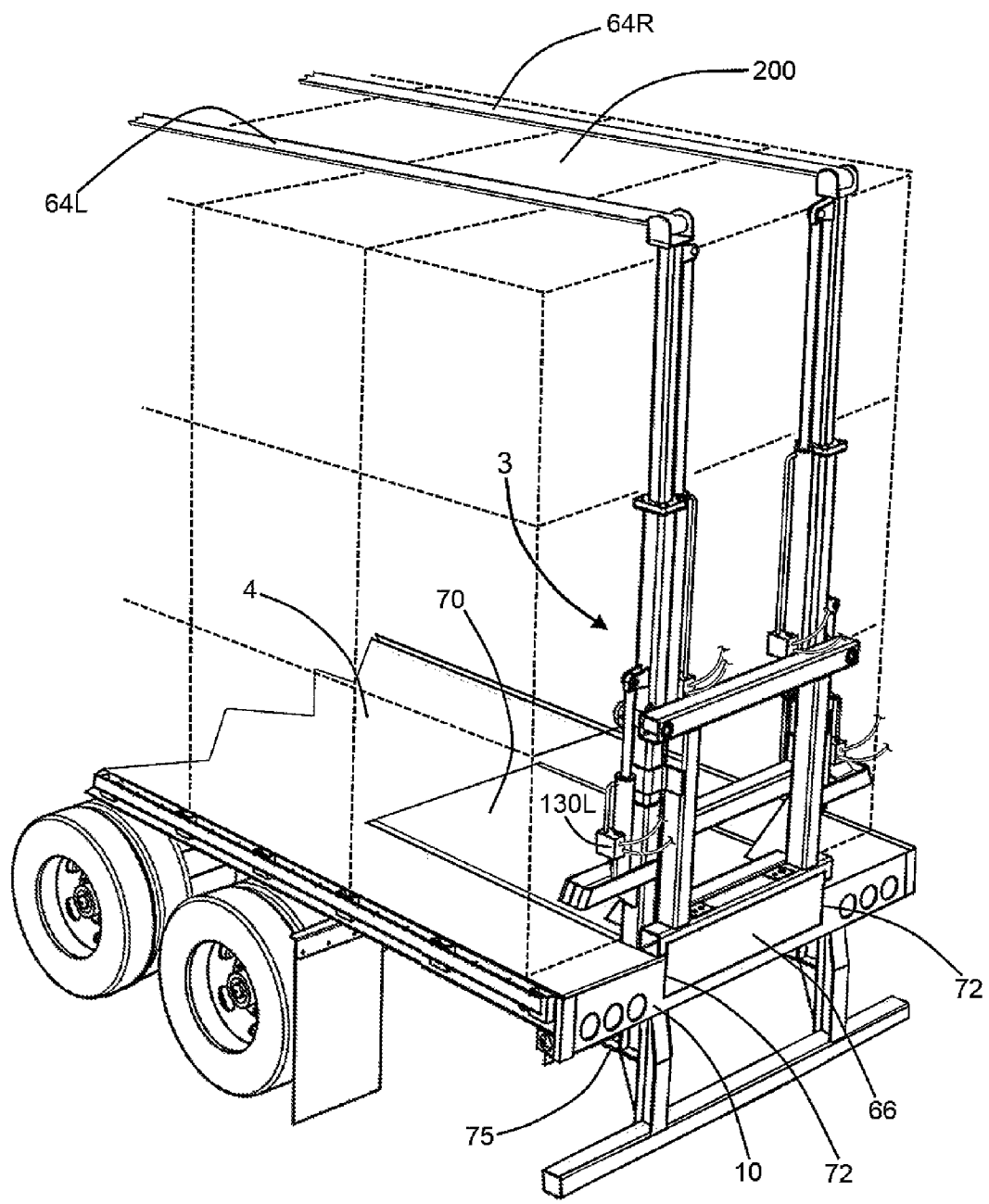
FIG. 3 redepicts the structure of FIG. 2, the view of FIG. 3 showing loaded square bales in dashed lines, and showing the rear bulkhead jaw forwardly compressing against the loaded bales.

Referring simultaneously to FIGS. 1-4, the instant inventive vehicle preferably comprises first extending and retracting means which are connective operatively to the "C" clamp frame 4,75, such extending and retracting means preferably being adapted for reciprocatingly moving the bulkhead jaw 3 in longitudinal and oppositely longitudinal directions between a bale releasing position, as depicted in FIG. 2, and a bale securing and compressing position, as depicted in FIG. 3. In a preferred embodiment, the first extending and retracting means preferably comprise a rigid sliding panel or sub-chassis component 66 which may slidably and reciprocatingly move within a rearwardly opening load bed recess 72. The first extending and retracting means preferably further comprise two way hydraulic cylinders 74 which are anchored at their base ends upon chassis 75 and which operatively connect with slide panel 66. Slidably overlapping floor panels 68 and 70 are preferably provided for assuring a continuous and unapertured load bed floor surface while the rear bulkhead jaw 3 variably occupies its rearward extended and forwardly retracted positions. Upon loading of hay bales 200 within loading space 7 indicated upon FIG. 2 in the stacked manner indicated in FIG. 3, the first extending and retracting means' hydraulic cylinders 74 may be actuated to draw the rear bulkhead jaw 3 forwardly into compressive contact with rearward aspects of the rearmost bales 200, such forward pressure compressing and slightly shifting all bales 200 forwardly into compressive contact with the front bulkhead jaw 2. Such longitudinal pressure advantageously secures the bales 200 within space 7 against longitudinal load shifting.

The instant inventive vehicle 1 preferably further incorporates second extending and retracting means which are connected operatively to the front and rear jaws 2 and 3, such means preferably being adapted for reciprocatingly moving the distal ends of such jaws' upper segments 22L, 24L, 22R, 24R, 122L, 122R, 124L, 124R, toward and away from such segments' proximal ends. Such second extending and retracting means preferably comprise such segments' configurations as telescoping shafts in combination with operative connections of hydraulic cylinders 28L, 28R, 128L, and 128R, such cylinders being connected via clevis mounts 32L, 34L, 32R, 34R, 132L, 132R, 134L, and 134R. Simultaneous actuations of the second extending and retracting means' cylinders 28L, 28R, 128L, and 128R, to move such segments' distal ends upwardly to the positions indicated in FIGS. 2 and 3 advantageously allows bale straps 64L and 64R to overlie and clear the upper surfaces of uppermost bales 200. Such clearance allows the pivoting upper segments of the front and rear bulkhead jaws 2 and 3 and the straps 64L and 64R they carry to pivot downwardly and laterally without interference of such straps with the bales 200. Upon an opposite actuation of the second extending and retracting means' cylinders, straps 64L and 64R may be forcefully drawn downwardly against the bales 200, compressively securing such bales against the load bed 4.

Figure 4:
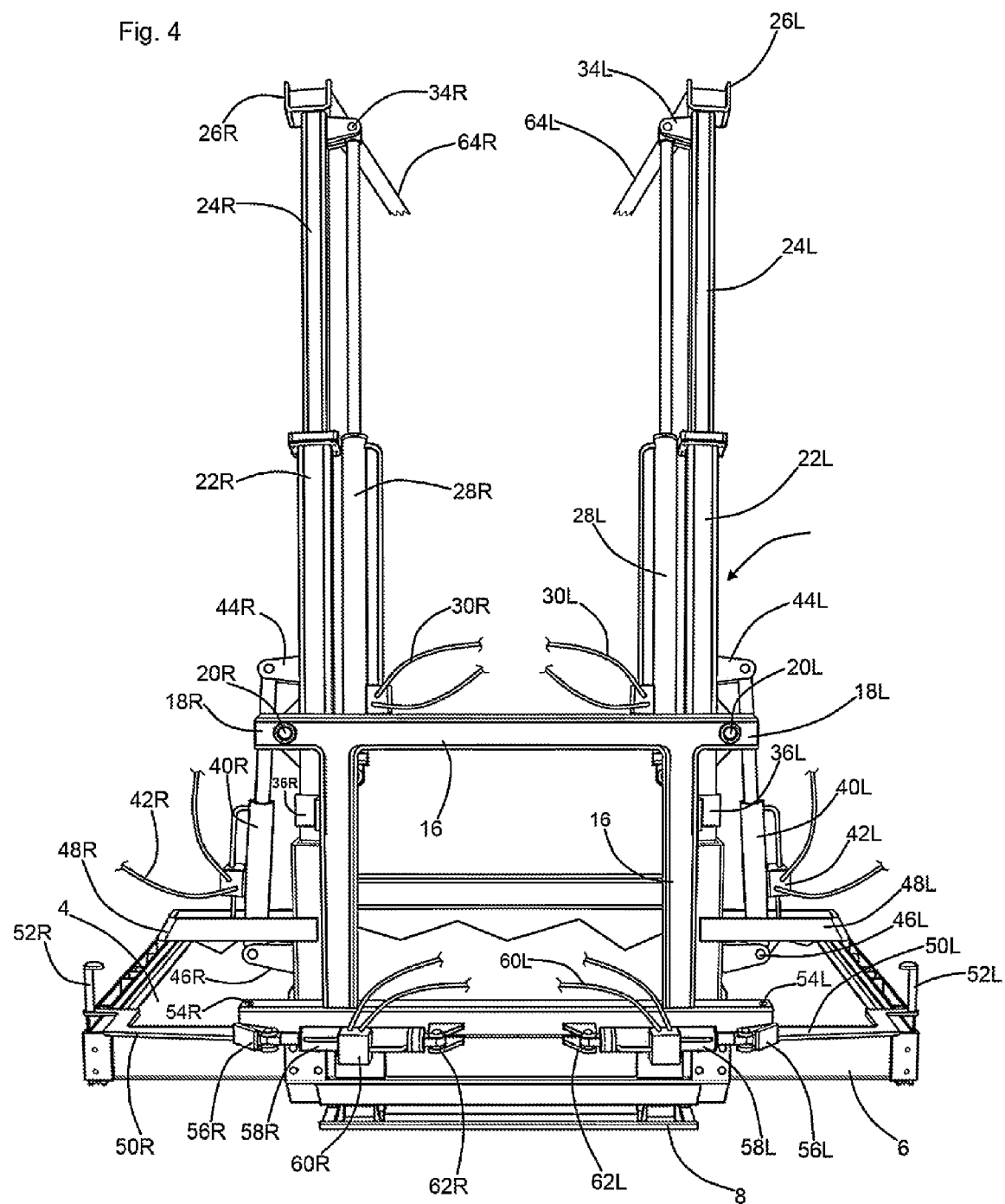
FIG. 4 is a partial front view of the instant inventive vehicle, the view of FIG. 4 showing upper arm segments of the front bulkhead jaw upwardly extended.
Figure 5:
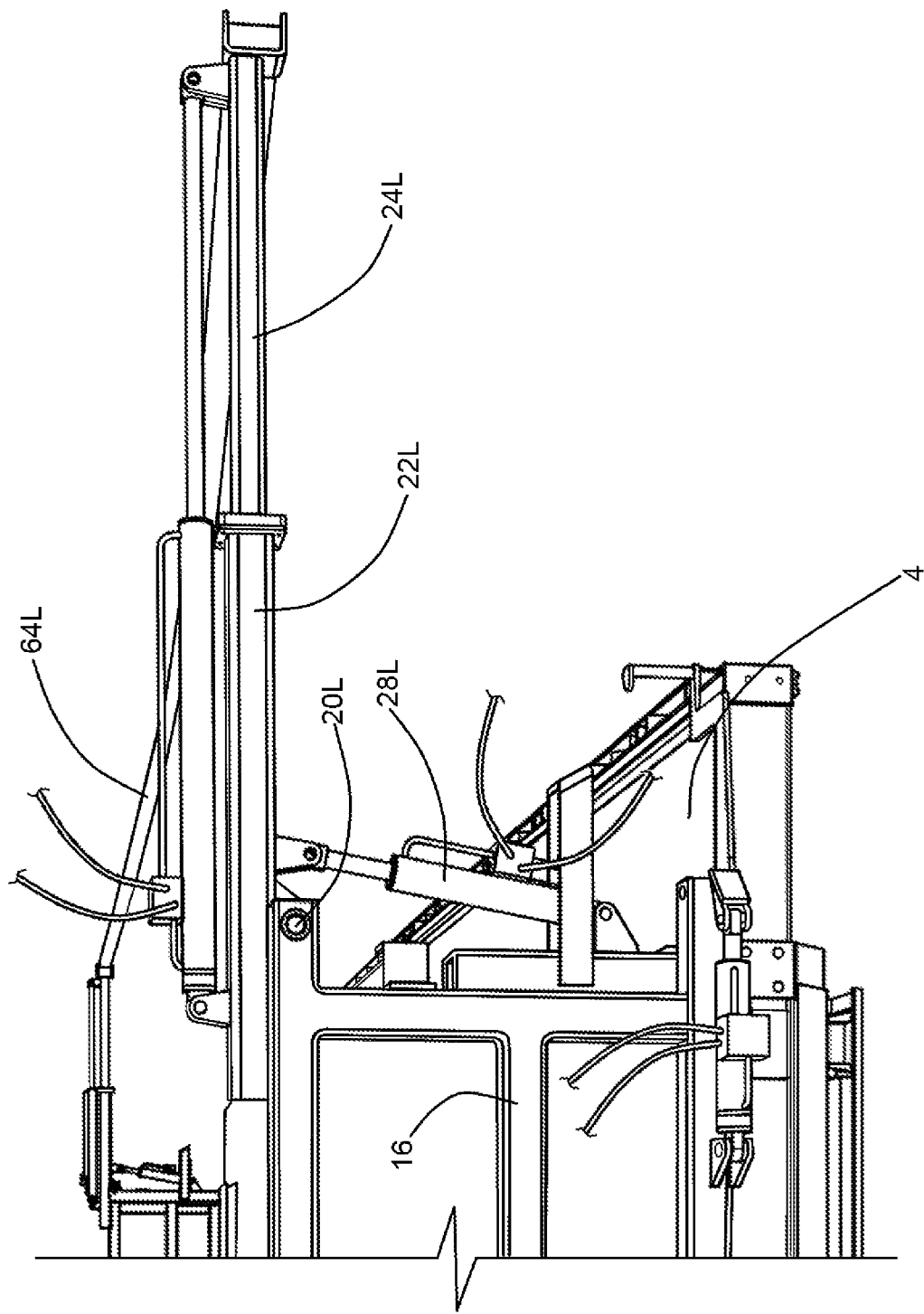
FIG. 5 is a partial redepiction of the structure of FIG. 1, the view of FIG. 5 showing a lateral bale strap extension.

The instant inventive vehicle preferably further comprises third extending and retracting means which are connected operatively to the upper segments of the front and rear bulkhead jaws 2 and 3, such means being adapted for alternatively pivoting and counter-pivoting at least a first bale strap and preferably the left and right bale straps 64L and 64R between bale clearing positions, as depicted in FIGS. 2, 3, and 4, and bale clearing positions depicted in FIG. 6. As indicated in FIG. 2, while the bale straps 64L and 64R occupy their overhead bale securing positions, they are poised for operation of the invention's second extending and retracting means for downwardly pulling the bale straps 64L and 64R against the bales 200. Upon lateral pivoting movement of the bale straps 64L and 64R to the bale clearing positions depicted in FIG. 6, they advantageously extend closely adjacent to, and preferably underlying, the left and right edges of the load bed 4. Such clearance positioning of straps 64L and 64R allows the bales 200 to be loaded and stacked upon the load bed 4 without any strap contact or strap interference. In the preferred embodiment, the invention's third extending and retracting means comprise a combination of the upper segments' pivot mounts 20L, 20R, 120L, and 120R, and triangulating hydraulic cylinders 40L, 40R, 140L, and 140R, such cylinders being mounted for pivoting actuation between the front and rear jaws' lower segments 16 and 116, and the upper segments via clevis mounts 44L, 46L, 44R, 46R, 144L, 146L, 144R, and 146R.

Figure 7:
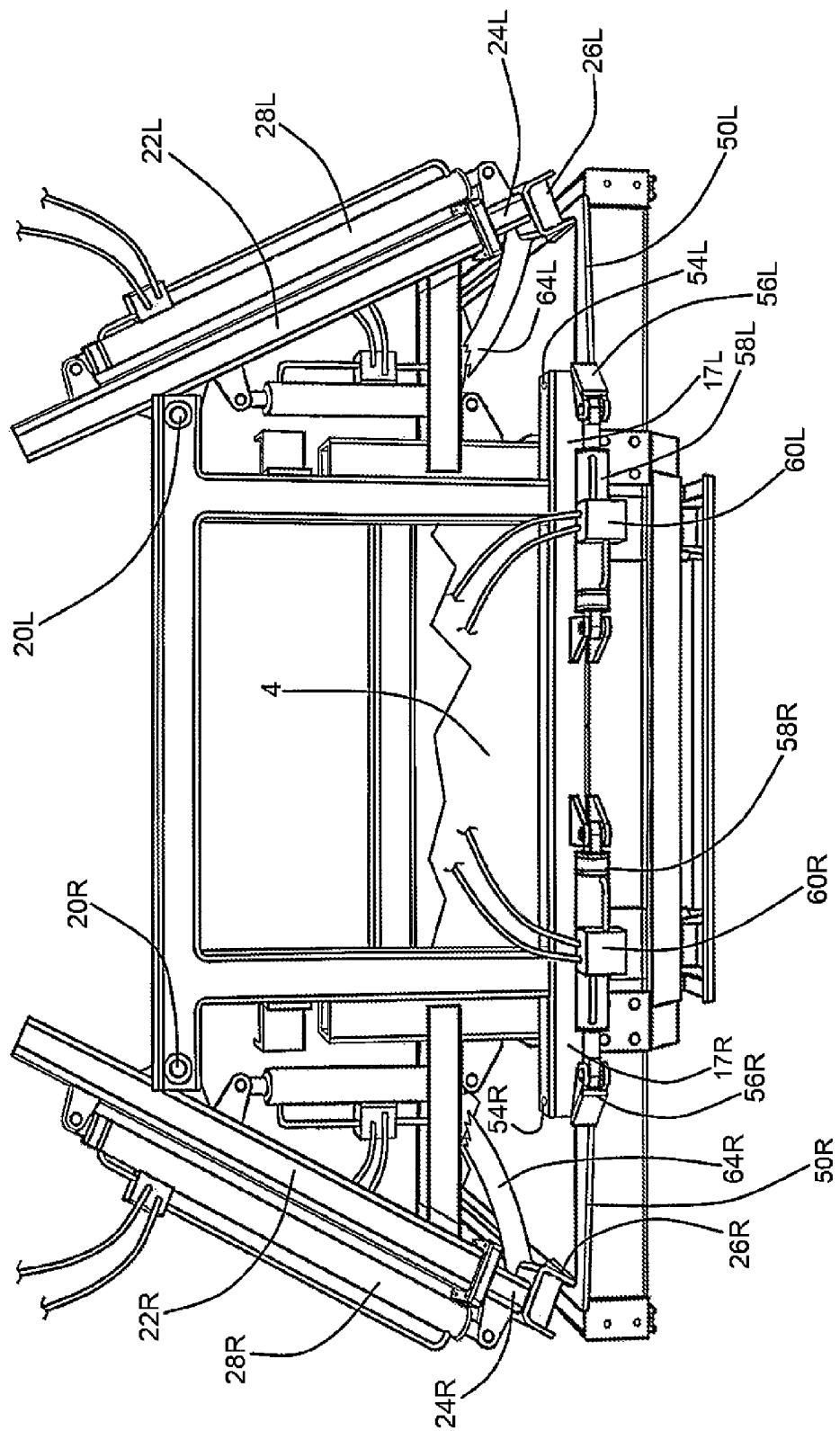
FIG. 7 redepicts the structure of FIG. 6, the view of FIG. 6 showing arm segment distal ends and bale straps alternatively positioned over the load bed.
Figure 8:
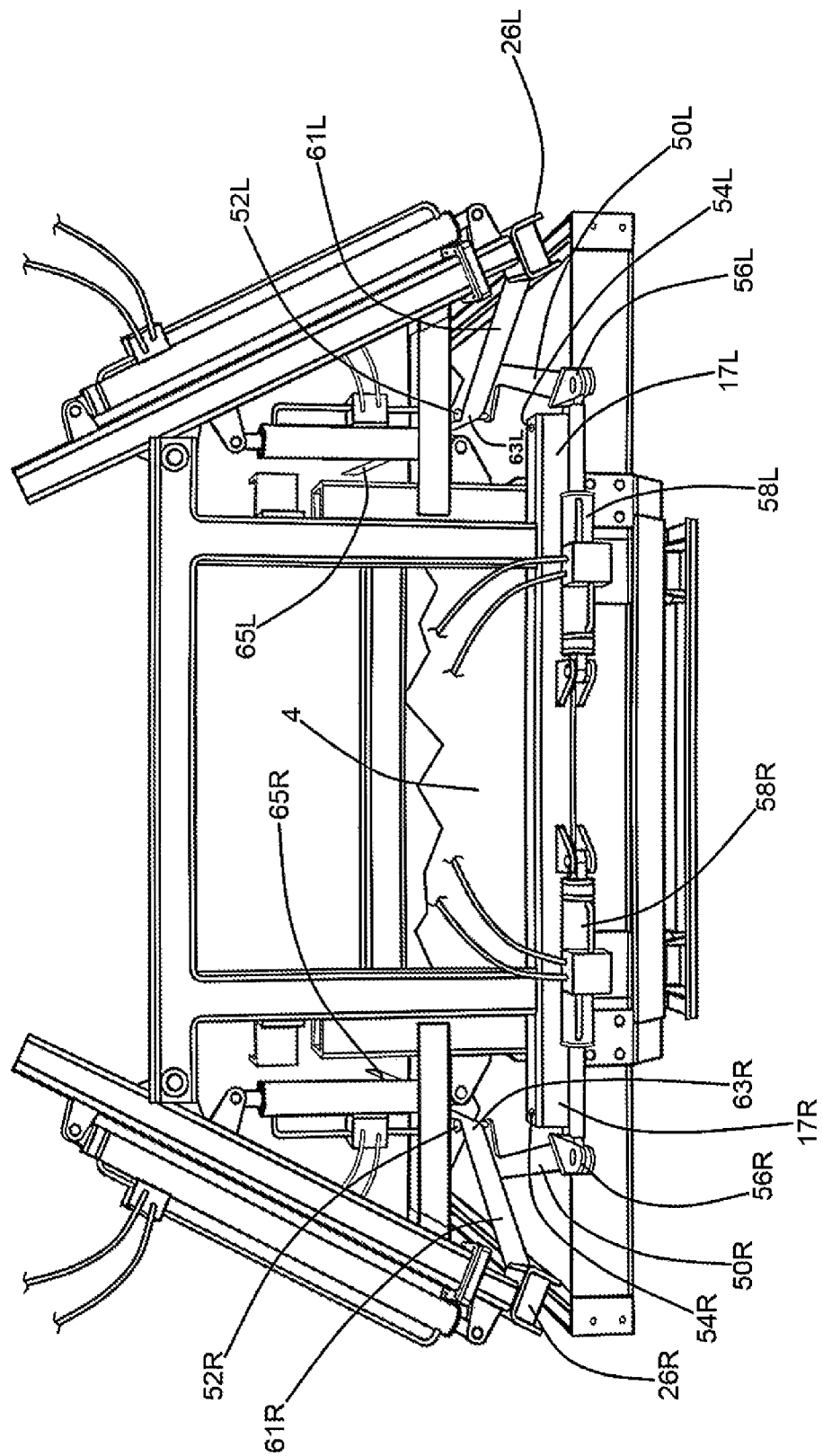
FIG. 8 redepicts the structure of FIG. 7, the view of FIG. 8 showing operation of the instant invention's bale strap tensioning means.

Referring further simultaneously to all figures, in order to suitably configure and deploy the instant invention's bale straps 64L and 64R during unloaded over the road travel, the instant invention preferably further comprises strap tensioning means which are adapted for eliminating any slack or loose deployment of straps 64L and 64R upon the upper surface of the load bed 4. Such loose deployment or strap slack is depicted in FIG. 7. Upon such loose or slackened strap deployment, wind coursing over the upper surfaces of the load bed 4 undesirably whips the straps 64L, 64R, causing premature wear and breakage. In the preferred embodiment, the strap tensioning means comprise at least a first, and preferably first and second or left and right strap hooks, such hooks preferably comprising left and right pivot arms 50L and 50R in combination with strap engaging pins 52L and 52R which extend vertically from such pivot arms' distal ends. The strap tensioning means preferably further comprise fourth extending and retracting means comprising left and right cylinders 58L and 58R, such cylinders being anchored upon lower segment 16 via clevis mounts 62L and 62R. The cylinders 62L and 62R operatively connect to pivot actuating arms 56L and 56R which, upon actuation of the cylinders 58L and 58R, pivotally extend actuator arms 56L and 56R about pivot bearings 54L and 54R from the retracted positions depicted in FIG. 7 to the pivotally extended positions depicted in FIG. 8. Hook arms 50L and 50R simultaneously pivot inwardly to cause their strap engaging pins 52L and 52R to capture and inwardly draw the bale straps 64L and 64R from their slackened configurations depicted in FIG. 7 to the desired tensioned configuration depicted in FIG. 8. Such tensioned inward drawing of the straps 64L and 64R advantageously moves the straps 64L and 64R to a "V" configuration including leg extensions 61L, 65L, 61R, and 65R which meet at vertices 63L and 63R at the points of contact with pins 52L and 52R. Opposite actuation of cylinders 58L and 58R outwardly pivots hooks 50L,52L and 50R,52R to release straps 64L and 64R.

Referring simultaneously to all figures, the instant invention's preferably hydraulically actuated first, second, third, and fourth extending and retracting means are powered by a representative matrix of hydraulic fluid lines and valves 73, 30L, 30R, 130L, 130R, 42L, 42R, 142L, 142R, 60L, and 60R. For purposes of safety, the hydraulic power matrix associates with the cylinders hydraulically locking safety valves (indicated as box structures attached to the cylinders), each such valve operating to occlude hydraulic fluid at one side of the cylinder's piston upon a pressure drop experienced at the other side of that piston. In a preferred embodiment, such hydraulic power matrix further comprises an electric motor driven hydraulic fluid pump and reservoir mounted beneath the load bed 4 (not depicted within views), and such hydraulic system is preferably remotely actuatable from the truck's or tractor trailer's cab. In the preferred embodiment, the rear bulkhead jaw motion and all of the bale strap positioning and configuring motions described above are remotely hydraulically actuatable by an operator from the truck cab, without any requirement for the operator to exit the truck cab.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention claimed is:

1. A vehicle having a load bed for bale loading, bale carriage, and bale off-loading, the vehicle comprising:
   (a) a "C" clamp having a frame comprising a load bed and having front and rear jaws, each jaw among the "C" clamp's front and rear jaws having a lower segment and at least a first upper segment, each at least first upper segment having proximal and distal ends, the frame extending longitudinally between the front and rear jaws' lower segments;
   (b) means for extending and retracting one of the jaws among the front and rear jaws, said means being connected operatively to the one of the jaws, said means being adapted for alternatively positioning the front and rear jaws with respect to each other at bale compressing and bale releasing positions;

(c) means for extending and retracting the front and rear jaws' at least first upper segments, said means being connected operatively to said segments, said means being adapted for alternatively moving the at least first upper segments' distal ends away from and toward their proximal ends;

(d) at least a first bale strap extending between the at least first upper segments' distal ends;

(e) means for pivoting the front and rear jaws' at least first upper segments with respect to the front and rear jaws' lower segments, said means being adapted for pivoting and counter-pivoting the at least first bale strap between bale securing and bale clearing positions, the at least first bale strap overlying the load bed upon pivoting to the bale securing position and the at least first bale strap being displaced downwardly and laterally from the bale securing position upon counter-pivoting toward the bale clearing position; and (f) a plurality of wheels fixedly attached to the frame.

2. The vehicle of claim 1 wherein each jaw among the front and rear jaws comprises a second upper segment having proximal and distal ends, and further comprising a second bale strap extending between the second upper segments' distal ends.

3. The vehicle of claim 2 wherein the means for extending and retracting the one of the jaws and the means for extending and retracting the front and rear jaws' at least first upper segments comprise a plurality of linear motion actuators.

4. The vehicle of claim 3 wherein each actuator among the plurality of linear motion actuators comprises a hydraulic cylinder.

5. The vehicle of claim 4 wherein each upper segment among the front and rear jaws' at least first and second upper segments comprises a telescoping shaft.

6. The vehicle of claim 5 wherein the front jaw is longitudinally fixed with respect to the frame.

7. The vehicle of claim 1 further comprising means for tensioning the at least first bale strap, said means being connected operatively to the "C" clamp.

8. The vehicle of claim 7 wherein the means for tensioning the at least first bale strap comprise at least a first pivoting hook adapted for, upon a slackening of the at least first bale strap upon the load bed, "V" configuring the at least first bale strap.

9. The vehicle of claim 8 further comprising means for extending and retracting the at least first pivoting hook, said means being connected operatively to the at least first pivoting hook, said means being adapted for moving the at least first pivoting hook between the "V" configuring positioning and a strap releasing position.

10. The vehicle of claim 9 wherein each jaw among the front and rear jaws comprises a second upper segment having proximal and distal ends, and further comprising a second bale strap extending between the second upper segments' distal ends, the means for tensioning the at least first bale strap further comprising a second pivoting hook adapted for, upon a slackening of the second bale strap upon the load bed, "V" configuring the second bale strap.

11. The vehicle of claim 10 wherein the means for extending and retracting the one of the jaws and the means for extending and retracting the front and rear jaws' at least first upper segments comprise a plurality of linear motion actuators.

12. The vehicle of claim 11 wherein each actuator among the plurality of linear motion actuators comprises a hydraulic cylinder.

13. The vehicle of claim 12 wherein each upper segment among the front and rear jaws' at least first and second upper segments comprises a telescoping shaft.

14. The vehicle of claim 13 wherein the front jaw is longitudinally fixed with respect to the frame.

\* \* \* \* \*